US008941862B2

(12) United States Patent
Tanabe

(10) Patent No.: US 8,941,862 B2
(45) Date of Patent: Jan. 27, 2015

(54) IMAGE FORMATION APPARATUS, IMAGE FORMATION SYSTEM, AND COMPUTER READABLE MEDIUM FOR CONTROLLING CONVEYANCE OF A PLANE-SHAPED RECORDING MEDIUM BETWEEN TWO IMAGE FORMATION APPARATUSES

(75) Inventor: Koh Tanabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1078 days.

(21) Appl. No.: 12/901,017

(22) Filed: Oct. 8, 2010

(65) Prior Publication Data

US 2011/0228294 A1 Sep. 22, 2011

(30) Foreign Application Priority Data

Mar. 17, 2010 (JP) ................................ 2010-060261

(51) Int. Cl.
*G06F 3/12* (2006.01)
*B41J 3/60* (2006.01)
*B41J 13/00* (2006.01)

(52) U.S. Cl.
CPC ................ *B41J 3/60* (2013.01); *B41J 13/0027* (2013.01)
USPC .............................. 358/1.15; 358/1.13; 271/1

(58) Field of Classification Search
USPC ................................................. 358/1.1–1.15
See application file for complete search history.

(56) References Cited

U.S. PATENT DOCUMENTS 5,376,957 A 12/1994 Gandy et al.
5,548,390 A * 8/1996 Sugisaki et al. .............. 399/364
2003/0026619 A1 2/2003 Miyoshi et al.
2004/0042035 A1 3/2004 Uejo
2005/0024411 A1* 2/2005 Takenouchi et al. ............ 347/16
2007/0041049 A1 2/2007 Kojima et al.
2008/0186526 A1 8/2008 Kidani et al.

FOREIGN PATENT DOCUMENTS

AU 2010224345 A1 9/2011
CN 1439938 A 9/2003

(Continued)

OTHER PUBLICATIONS

Daisuke, English Machine Translation of JP2007-055186, Mar. 2007, JPO.*

(Continued)

*Primary Examiner* — Benny Q Tieu
*Assistant Examiner* — Michael Y Tzeng
(74) *Attorney, Agent, or Firm* — Oliff PLC

(57) ABSTRACT

An image formation apparatus includes an image formation processing managing unit and a control unit. The image formation processing managing unit manages first image formation processing to form an image on a face of plane-shaped recording medium based on received information. The control unit controls conveyance of the plane-shaped recording medium between the image formation apparatus and the other image formation apparatus which performs second image formation processing to form an image on the other face of the plane-shaped recording medium, a second term needed to stop the second image formation processing since receiving an instruction to stop the second image formation processing on an image forming operation being longer than a first term needed to stop the first image formation processing since receiving an instruction to stop the first image formation processing on the image forming operation.

13 Claims, 17 Drawing Sheets

(56) References Cited

FOREIGN PATENT DOCUMENTS

| | | | |
|---|---|---|---|
| CN | 1479196 | A | 3/2004 |
| CN | 1916783 | A | 2/2007 |
| EP | 1 939 005 | A1 | 7/2008 |
| JP | A 2001-287421 | | 10/2001 |
| JP | A 2004-34506 | | 2/2004 |
| JP | A 2004-184922 | | 7/2004 |
| JP | A 2007-55186 | | 3/2007 |
| JP | A-2009-78408 | | 4/2009 |
| WO | WO 93/25389 | A1 | 12/1993 |
| WO | WO 01/56802 | A1 | 8/2001 |
| WO | WO 2009/108204 | A1 | 9/2009 |

OTHER PUBLICATIONS

Feb. 6, 2012 Office Action issued in Australian Patent Application No. 2010233038.

Office Action issued in Australian Patent Application No. 2010233038; issued Aug. 12, 2011.

Mar. 25, 2014 Search Report issued in European Patent Application No. 10187305.7.

May 5, 2014 Office Action issued in Chinese Patent Application No. 201010559909.2 (with translation).

Nov. 21, 2013 Office Action issued in Japanese Patent Application No. 2010-060261 (with translation).

* cited by examiner

IMAGE FORMATION APPARATUS, IMAGE FORMATION SYSTEM, AND COMPUTER READABLE MEDIUM FOR CONTROLLING CONVEYANCE OF A PLANE-SHAPED RECORDING MEDIUM BETWEEN TWO IMAGE FORMATION APPARATUSES

CROSS-REFERENCE TO RELATED APPLICATIONS

This application is based upon and claims priority under 35 USC 119 from Japanese Patent Application No. 2010-060261, filed Mar. 17, 2010.

BACKGROUND

Technical Field

The present invention relates to an image formation apparatus, an image formation system, and a computer readable medium.

SUMMARY OF THE INVENTION

According to an aspect of the invention, an image formation apparatus includes an image formation processing managing unit and a control unit. The image formation processing managing unit manages first image formation processing to form an image on a face of plane-shaped recording medium based on received information. The control unit controls conveyance of the plane-shaped recording medium between the image formation apparatus and the other image formation apparatus which performs second image formation processing to form an image on the other face of the plane-shaped recording medium, a second term needed to stop the second image formation processing since receiving an instruction to stop the second image formation processing on an image forming operation being longer than a first term needed to stop the first image formation processing since receiving an instruction to stop the first image formation processing on the image forming operation. The control unit performs control of conveyance of the plane-shaped recording medium so as to convey the plane-shaped recording medium for a given term longer than the first term when receiving an instruction to stop the image forming operation.

BRIEF DESCRIPTION OF THE DRAWINGS

Exemplary embodiments of the invention will be described in detail based on the following figures, wherein.

DETAILED DESCRIPTION (Whole Configuration)

Figure 1:
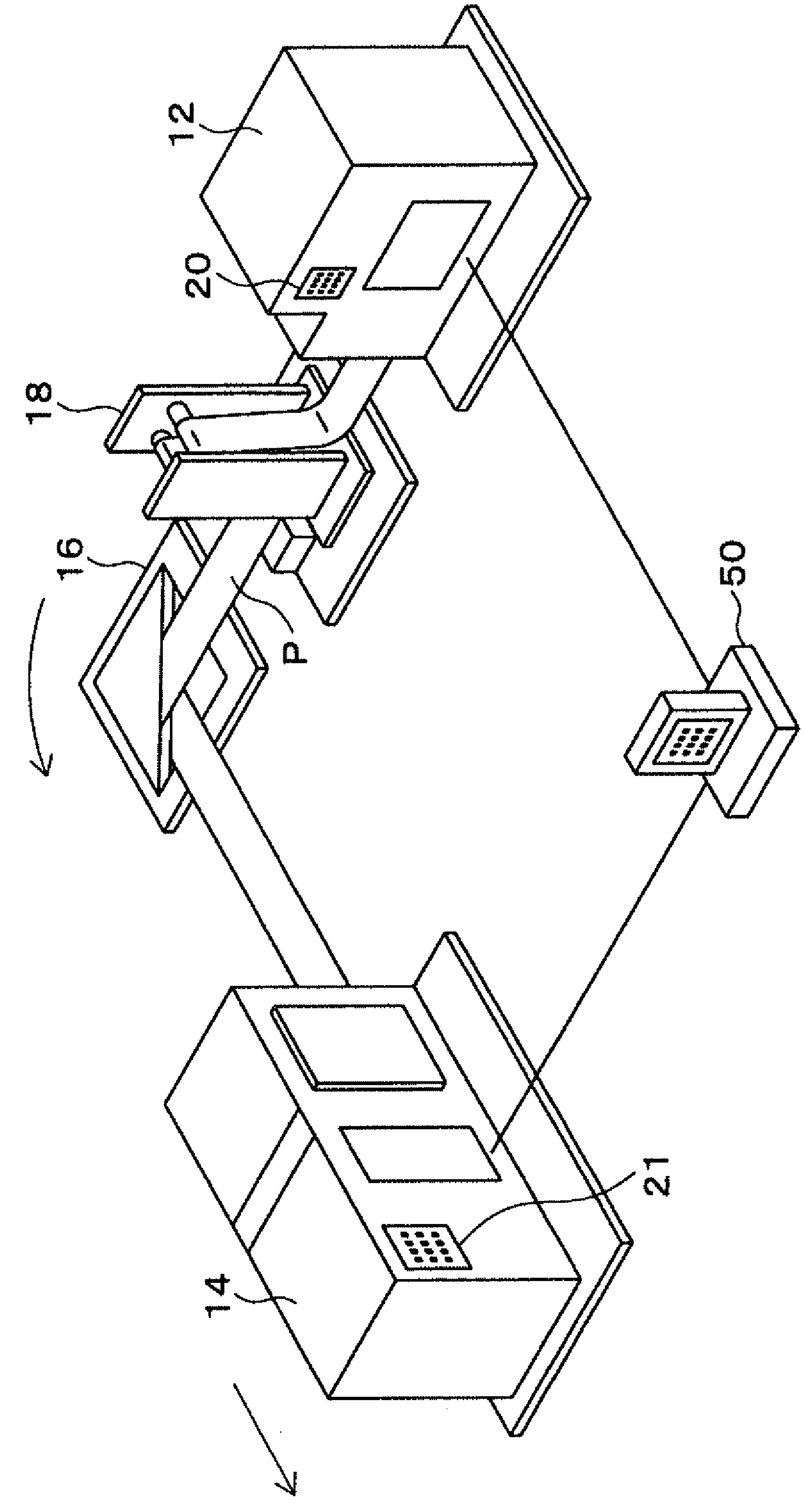
FIG. 1 is a perspective view of a cascade printing system according to an exemplary embodiment.
Figure 2:
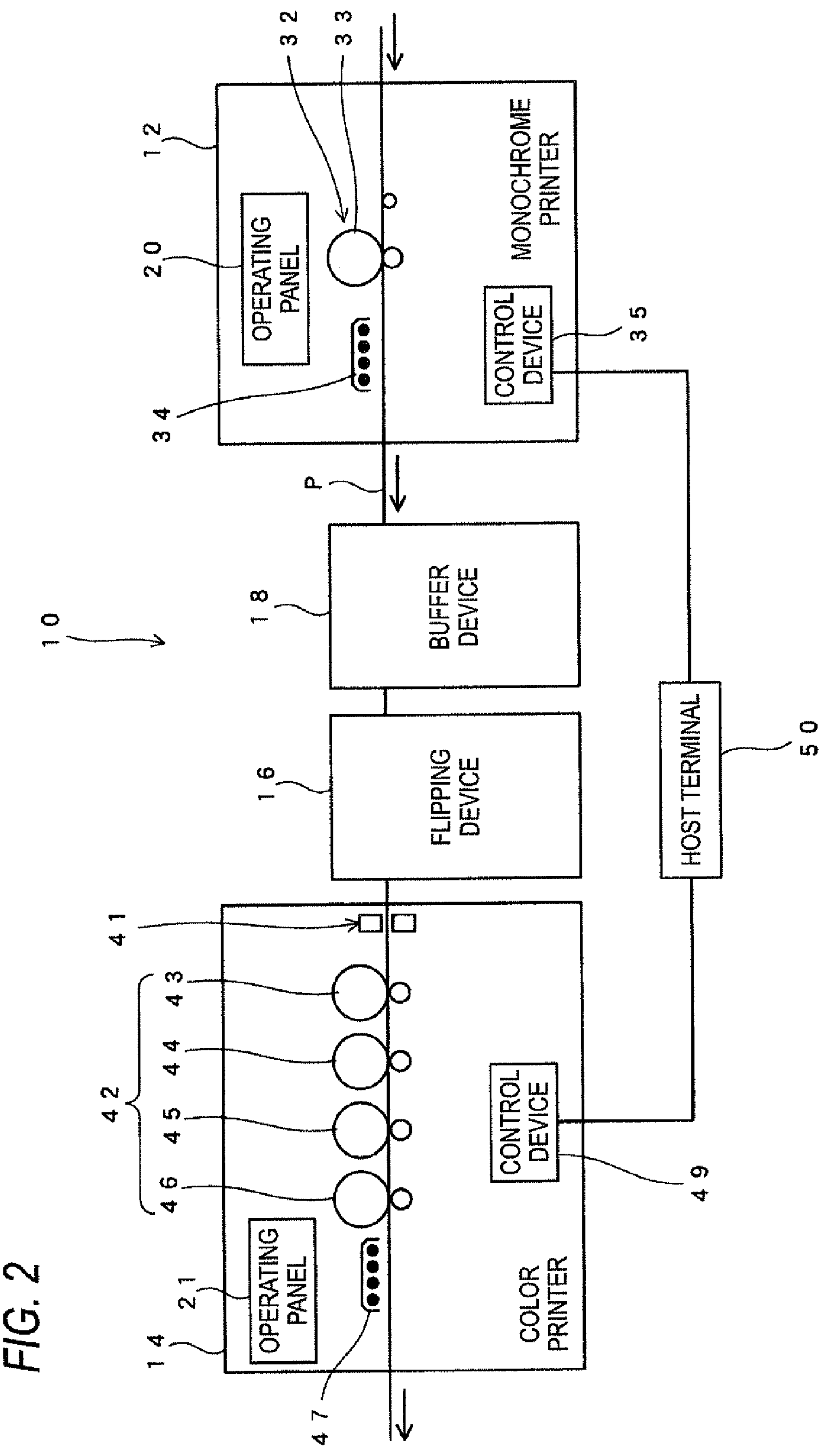
FIG. 2 is a conceptual diagram of the cascade printing system according to the exemplary embodiment.

An exemplary embodiment of the present invention will be described below. FIG. 1 shows an example cascade printing system 10 according to the invention. FIG. 2 is a block diagram of the cascade printing system 10 of FIG. 1. The cascade printing system 10 has a function of performing printing on the front and back surfaces of a continuous sheet (example plane-shaped recording medium) using a monochrome printer 12 and a color printer 14.

The monochrome printer 12 is disposed on the upstream side in a conveyance path of a continuous sheet P. The monochrome printer 12 is an image formation apparatus for forming monochrome (in this case, black-and-white) images. Although not shown in FIG. 1 or 2, a sheet supply device (not shown) for supplying the continuous sheet P is disposed upstream of the monochrome printer 12. The continuous sheet P is supplied from the sheet supply device to the monochrome printer 12.

The monochrome printer 12 is equipped with a transfer unit 32 for transferring a toner image to the continuous sheet P being conveyed. The transfer unit 32 is equipped with a photoreceptor drum 33. An electrostatic latent image is formed on the photoreceptor drum 33 in such a manner that image drawing laser light or LED light is applied from an exposing device (not shown) to the photoreceptor drum 33 which is rotating and part of the surface of the photoreceptor drum 33 is exposed to the light. The electrostatic latent image is developed with a black toner by a developing device (not shown) into a monochrome toner image, which is held by the photoreceptor drum 33. The toner image is transferred from the photoreceptor drum 33 to the continuous sheet P.

A fusing device 34 is disposed downstream of the transfer unit 32. The fusing device 34 fuses a toner image on the continuous sheet P by illuminating it with strong light. Alternatively, a fusing device which fuses a toner image by heat and pressure may be employed. The monochrome printer 12 is equipped with a control device 35, which controls operations of the monochrome printer 12. The control device 35 will be described later in detail.

The monochrome printer 12 forms positioning marks on the continuous sheet P. The positioning marks will be read by the downstream color printer 14 and used for positioning when the color printer 14 forms images on the back surface of the continuous sheet P.

The monochrome printer 12 is equipped with an operating panel 20, which is a touch panel display and is used by an operator to make various manipulations. Various kinds of information are displayed on the operating panel 20 in the form of an image.

The continuous sheet P on one surface of which images have been formed by the monochrome printer 12 is conveyed to a buffer device 18. The buffer device 18 has a function of bending, in itself, the continuous sheet P being conveyed and thereby preventing an event that the continuous sheet P is loosened, twisted, fluttered, made too tense, or rendered in other undesirable states.

A flipping device 16 is disposed downstream of the buffer device 18. The flipping device 16 flips over the continuous sheet P and supplies the flipped continuous sheet P to the downstream color printer 14. If the monochrome printer 12 and the color printer 14 have mechanisms for causing printing on different surfaces, the flipping device 16 can be omitted.

The continuous sheet P that has been flipped over by the flipping device 16 is conveyed to the color printer 14, where images are formed on the surface that is opposite to the surface on which the images were formed by the monochrome printer 12. The color printer 14 is an image formation apparatus capable of forming a color image.

The color printer 14 is equipped with an optical sensor 41, which optically detects the positioning marks that were formed on the continuous sheet P by the monochrome printer 12. A transfer unit 42 is disposed downstream of the optical sensor 14. The transfer unit 42 is equipped with photoreceptor drums 43-46 on which toner images of primary colors Y, M, C, and K are to be formed, respectively. Each of the photoreceptor drums 43-46 is configured in the same manner as the photoreceptor drum 33 of the monochrome printer 12 except for the toner color.

In the transfer unit 42, toner images are formed on the surface of the continuous sheet P that is opposite to the surface on which the images were formed by monochrome printer 12. A fusing device 47 is disposed downstream of the transfer unit 42. Like the fusing device 34, the fusing device 47 fuses the toner images on the continuous sheet P by illuminating them with strong light. Alternatively, a fusing device which fuses toner images by heat and pressure may be employed.

The color printer 14 is equipped with a control device 49, which controls operations of the color printer 14. The control device 49 will be described later in detail. The color printer 14 is equipped with an operating panel 21, which is a touch panel display and is used by an operator to make various manipulations. Various kinds of information are displayed on the operating panel 21 in the form of an image.

The cascade printing system 10 is further equipped with a host terminal 50, which is a terminal for making manipulations relating to operations of the cascade printing system 10. Connected to a communication network (not shown) such as a LAN, the host terminal 50 acquires, over the communication network, image data (for both of the front and back surfaces) of contents to be printed by the cascade printing system 10. The host terminal 50 sends image data for a first surface and image data for a second surface that are contained in the received image data to the monochrome printer 12 and the color printer 14, respectively. The host terminal 50 also sends various kinds of setting information and control signals to the printers 12 and 14.

Alternatively, the host terminal 50 may be omitted, in which case the cascade printing system 10 is configured so as to be manipulated by the operating panel 20 or 21. In this case, the control device 35 or 49 is given the functions of the host apparatus 50.

In the above-described cascade printing system 10, positioning marks are used for registration between images to be formed on the front surface of a continuous sheet P and images to be formed on its back surface. That is, positioning marks are formed on one surface of a continuous sheet P by the monochrome printer 12. The positioning marks are read optically by the optical sensor 41 of the color printer 14, and images are formed on the other surface by the color printer 14 using the detected positioning marks so as to be registered with images formed on the one surface. The positioning marks are formed at such positions as to be not conspicuous (e.g., near an edge of a continuous sheet P).

(Configuration of Control Systems)

Figure 3:
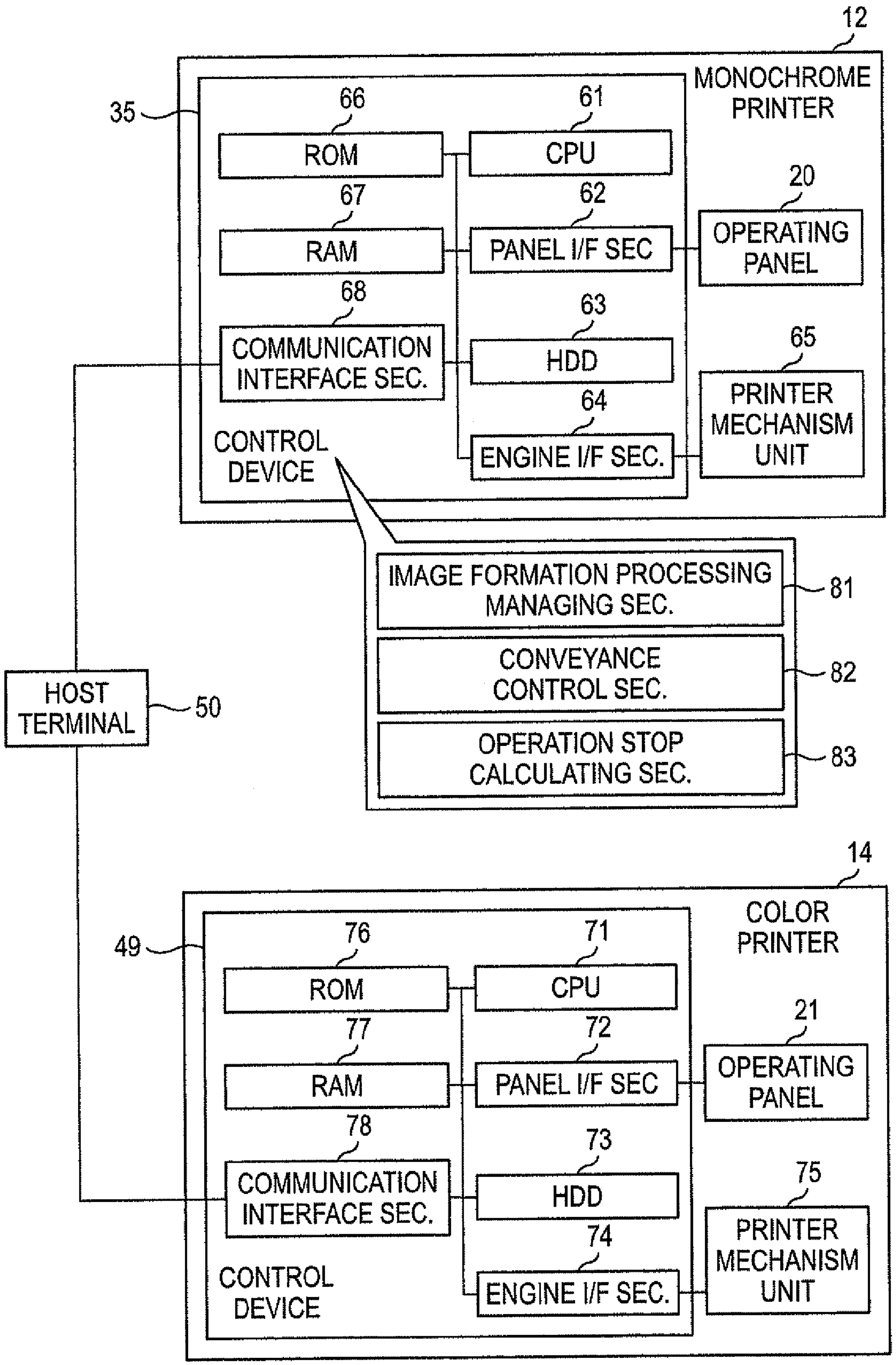
FIG. 3 is a block diagram showing a control system of the cascade printing system according to the exemplary embodiment.

FIG. 3 shows control systems of the monochrome printer 12 and the color printer 14. As shown in FIG. 3, the control device 35, which functions as a computer, is equipped with a CPU 61, a panel I/F section 62, an HDD 63, an engine I/F section 64, a ROM 66, a RAM 67, and a communication I/F section 68. The CPU 61 is a device for supervising operations of the control device 35 and executes processes which will be described later. Various kinds of processes relating to an image forming operation are executed as the CPU 61 operates. The panel I/F section 62 is an interface device for interfacing between the control device 35 and the operating panel 20. The HDD (hard disk drive) 63 stores various kinds of information.

The engine I/F section 64 is an interface device for interfacing between the control device 35 and a printer mechanism unit 65. The printer mechanism unit 65 includes mechanisms that are provided inside the monochrome printer 12 and relate to an image forming operation and conveyance of a continuous sheet P. The ROM 66 is stored with programs and various settings for operations to be described later. The RAM 67 functions as a storage area for temporarily storing image data of images to be formed and various data. The communication I/F section 68 serves for communication with the host terminal 50 and communication with the color printer 14 via the host terminal 50. The communication I/F section 68 also receives image data of images to be printed by the monochrome printer 12 over the communication network via the host terminal 50. Images of the received image data are formed on a continuous sheet P as the engine I/F section 74 controls the printer mechanism unit 65 on the basis of the received image data.

From the functional viewpoint, the control device 35 is equipped with an image formation processing managing section 81, a conveyance control section 82, and an operation stop calculating section 83. The image formation processing managing section 81 manages processing of forming images on one surface of a continuous sheet P on the basis of image data that is received from the host terminal 50. The conveyance control section 82 controls conveyance of a continuous sheet P to the color printer 14 which takes a longer time to stop an image forming operation than the monochrome printer 12 when instructed to do so and which forms images on the other surface of the continuous sheet P. The conveyance control section 82 also controls conveyance of the continuous sheet P that is continued even after completion of image formation on the one surface of the continuous sheet P. The operation stop calculating section 83 calculates parameters that are necessary for adjustment blank printing which is performed after completion of image formation using received image data (i.e., an externally supplied print content) to stop the monochrome printer 12 at the same time as the color printer 14 is stopped.

The control device 49 has the same basic internal configuration as the control device 35. However, in this example, the control device 49 merely performs image formation on the basis of received image data and, unlike the control device 35, does not control conveyance of a continuous sheet P after completion of image formation on the basis of image data received by itself.

(Principle of Operation)

Figure 4A:
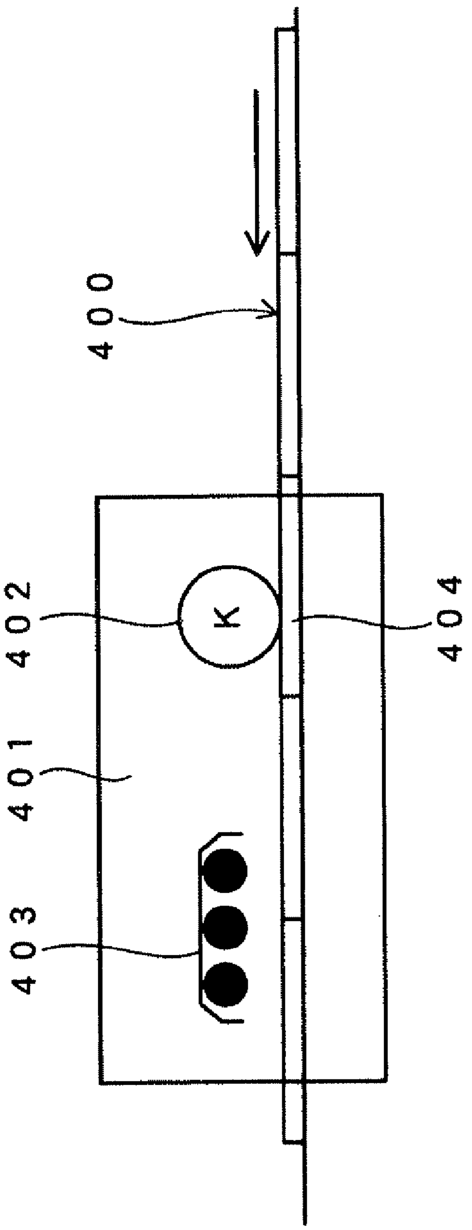
FIGS. 4A and 4B are conceptual diagrams illustrating the principle of operation of the exemplary embodiment.

The principle of operation of the cascade printing system 10 of FIG. 1 will be described below. First, a background phenomenon of the principle of operation will be described. FIG. 4A shows a monochrome printer 401 for forming monochrome images on a continuous sheet 400. The monochrome printer 401 is equipped with a photoreceptor drum 402 on which a K color toner image to be transferred to the continuous sheet 400 is to be formed and a fusing device 403 for fusing the toner image that has been transferred to the continuous sheet 400 by illuminating it with strong light.

Consideration will be given to a case of stopping, in the state of FIG. 4A, an operation of forming a monochrome image on the continuous sheet 400 by the monochrome printer 401 while conveying the continuous sheet P leftward (as viewed in FIG. 4A). In this case, the image formation is interrupted halfway on page 404. Whereas page 404 is not usable because printing has not been performed yet on part of it, pages for which printing has already completed (i.e., the pages on the left of page 404) can be used as printed matter.

Figure 4B:
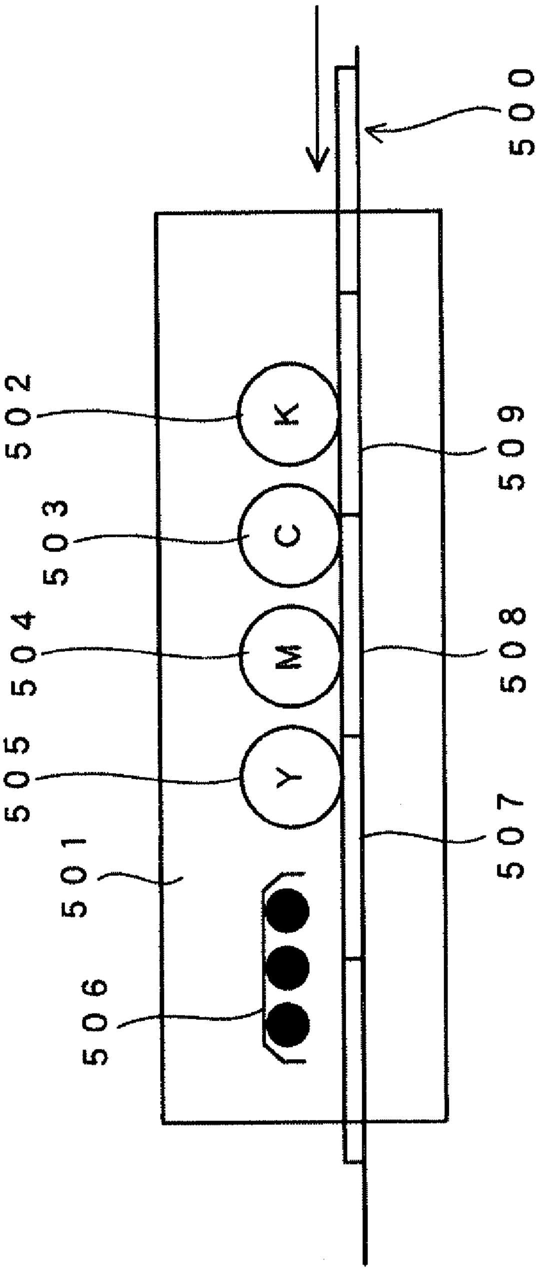

On the other hand, FIG. 4B shows a color printer 501 for forming a color image. The color printer 501 is equipped with a photoreceptor drum 502 on which a K color toner image to be transferred to a continuous sheet 500 is to be formed, a photoreceptor drum 503 on which an C color toner image is to be formed, a photoreceptor drum 504 on which a M color toner image is to be formed, and a photoreceptor drum 505 on which a Y color toner image is to be formed. The color printer 501 is also equipped with a fusing device 506 for fusing the toner images that have been transferred to the continuous sheet 500 by illuminating them with strong light.

Consideration will be given to a case of stopping, in the state of FIG. 4B, an operation of forming a color image on the continuous sheet 500 by the color printer 501 while conveying the continuous sheet P leftward (as viewed in FIG. 4B). In this case, Y, M, C, and K color toner images are formed on part of page 507 of the continuous sheet 500 and hence an intended color image is formed partially on page 507. However, an incomplete color image consisting of M, C, and K color toner images (a Y color is not included) is formed between the photoreceptor drums 505 and 504. Likewise, an incomplete color image consisting of C and K color toner images (Y and M color toner images are not included) is formed between the photoreceptor drums 504 and 503, and only a K color toner image is formed (Y, M, and C color toner images are not formed) between the photoreceptor drums 503 and 502.

In this case, pages 507-509 are incomplete printed pages. In particular, pages 508 and 509 bear color images that are very low in image quality because toner images of only part of the primary colors are formed. In this manner, in the color printer 501 of FIG. 43, images that are very low in image quality is formed if an image forming operation is stopped immediately after reception of a stop instruction.

One method for solving this problem is to continue an image forming operation at least until Y, M, C, and K toner images are superimposed on each other when the color printer 501 is stopped. This prevents the above-described trouble that low-image-quality printing is performed.

However, when a cascade printing system is constructed in which the color printer 501 is disposed downstream of the monochrome printer 401, in an operation mode in which the color printer 501 is stopped after it continues to operate for an extra time from reception of a stop instruction, the color printer 501 continues to operate even after a stop of operation of the monochrome printer 401. Therefore, a continuous sheet is conveyed in the downstream color printer 501 in the state that it is not conveyed in the monochrome printer 401 which is not in operation. As a result, the continuous sheet is pulled and receives excessive tension, This may cause trouble that the continuous sheet is damaged or a new printing failure occurs in the color printer 501.

Conversely, if the color printer 501 is disposed upstream of the monochrome printer 401 and a similar operation is performed, the downstream monochrome printer 401 is stopped first and hence a continuous sheet is loosened between the color printer 501 and the monochrome printer 401. Up to a certain degree of loosening of the continuous sheet can be absorbed by a buffer device. However, the buffer apparatus is to absorb a low degree of loosening due to an operation timing error or the like occurring between apparatus of the same type, and it is difficult for the buffer apparatus to absorb loosening of a continuous sheet that occurs when a cascade-arranged color printer and monochrome printer are stopped at different times.

To solve the above case, in the exemplary embodiment, in the case where a cascade printing system is constructed in which the color printer 501 is disposed downstream of the monochrome printer 401, the monochrome printer 401 is not stopped upon reception of a printing stop instruction. Instead, the monochrome printer 401 continues to operate waiting for a stop of operation of the color printer 501 and is stopped at the same time as the color printer 501.

That is, the upstream monochrome printer 401 is not stopped as soon as it receives a stop instruction and continues to convey a continuous sheet to the downstream color printer 501. As a result, as toner images of the respective colors are superimposed on each other in the color printer 501 after reception of a stop instruction, both of the monochrome printer 401 and the color printer 501 convey the continuous sheet. This prevents the continuous sheet from becoming too tense. According to the same principle of operation, loosening of a continuous sheet is prevented in the case where the color printer 501 is disposed upstream of the monochrome printer 401.

(Example Operation 1)

Figure 5:
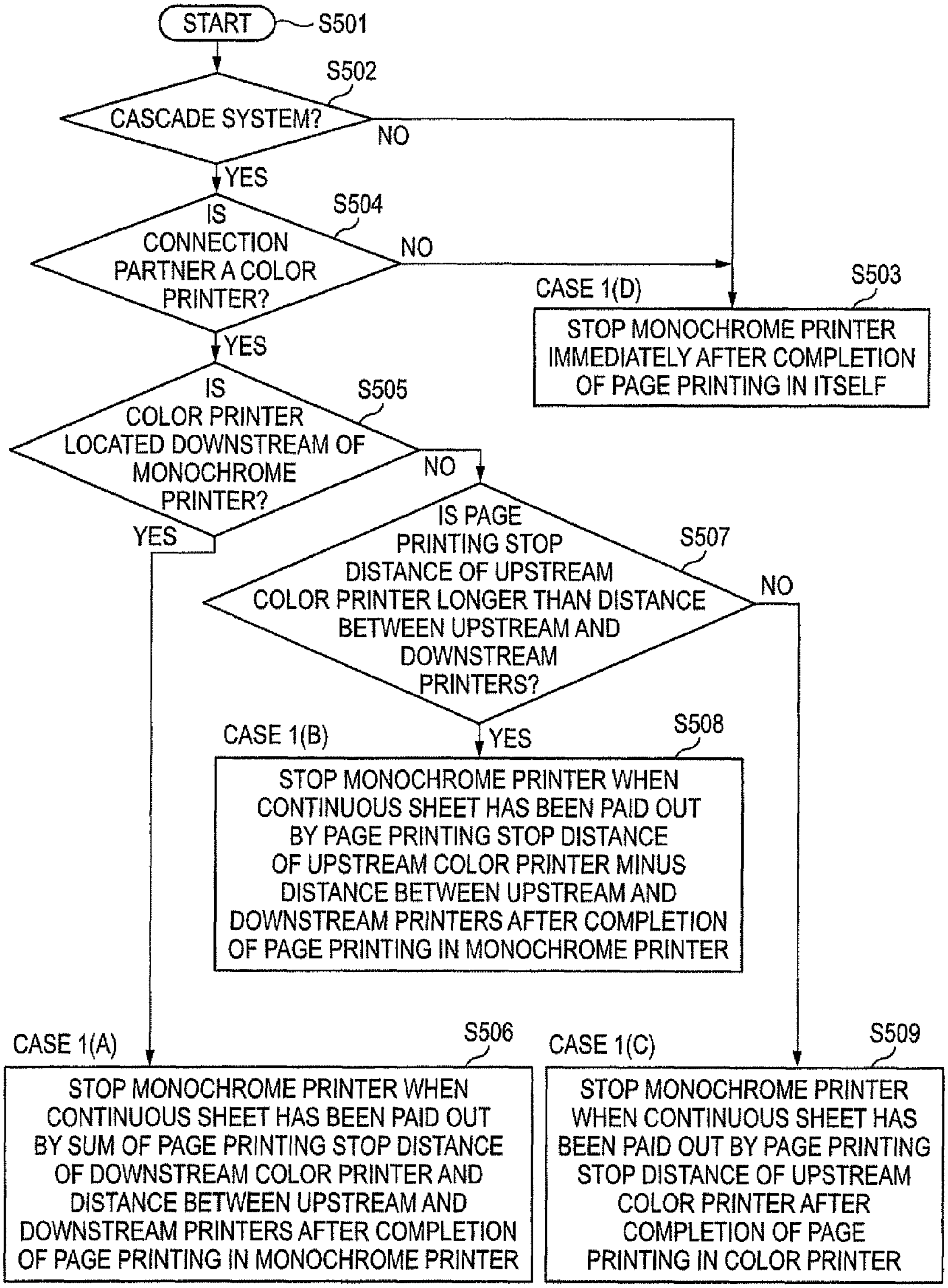
FIG. 5 is a flowchart of a process that is executed by a monochrome printer in stopping a printing operation.

A specific example operation of the cascade printing system 10 of FIG. 1 will be described below. FIG. 5 shows an example process which is executed by the monochrome printer 12 of the cascade printing system 10 of FIG. 1 in which the monochrome printer 12 and the color printer 14 are combined. The process of FIG. 5 is directed to not only the cascade printing system 10 of FIG. 1 in which the color printer 14 is disposed downstream of the monochrome printer 12 but also a cascade printing system in which the color printer 14 is disposed upstream of the monochrome printer 12.

For example, assume that an instruction to stop a double-sided printing operation being performed on a continuous sheet P in the cascade printing system of FIG. 1 is made in response to an operator manipulation or due to a certain abnormality. In this case, the process of FIG. 5 is started at step S501. At step S502, it is judged whether the monochrome printer 12 belongs to a cascade printing system. The process moves to step S504 if the monochrome printer 12 belongs to a cascade printing system, and moves to step S503 if not.

At step S503, image formation and conveyance of the continuous sheet P are stopped immediately after completion of page printing in the monochrome printer 12 (which is executing the process of FIG. 5). The term "page printing" means processing of forming images of image data received by the monochrome printer 12. At step S504, it is judged whether or not the printer to which the monochrome printer 12 is connected in the cascade printing system is a color printer. If the connection partner printer is not a color printer, the process moves to step S503. If the connection partner printer is a color printer, the process moves to step S505, where it is judged whether or not the connection partner color printer is located downstream of the monochrome printer 12.

If the connection partner color printer (color printer 14) is located downstream of the monochrome printer 12, the process moves to step S506, where after completion of page printing in the monochrome printer 12 the monochrome printer 12 pays out the continuous sheet P toward the color printer 14 by a distance that is the sum of a page printing stop distance of the downstream color printer 14 and a distance between the upstream monochrome printer 12 and the downstream color printer 14 (distance between the upstream and downstream printers).

The term "page printing stop distance" (or printing stop distance) is a conveyance distance of a continuous sheet P that is necessary for preventing formation of incomplete images that lack a toner image(s) of part of the primary colors (described above) in stopping an image forming operation of the color printer 14, that is, a conveyance distance by which the continuous sheet P is conveyed as the printing of pages under image formation is continued even after reception of a stop instruction until toner images of all colors included in image data are formed completely for those pages and, if necessary, the continuous sheet P is thereafter put outside the color printer 14.

Figure 15:
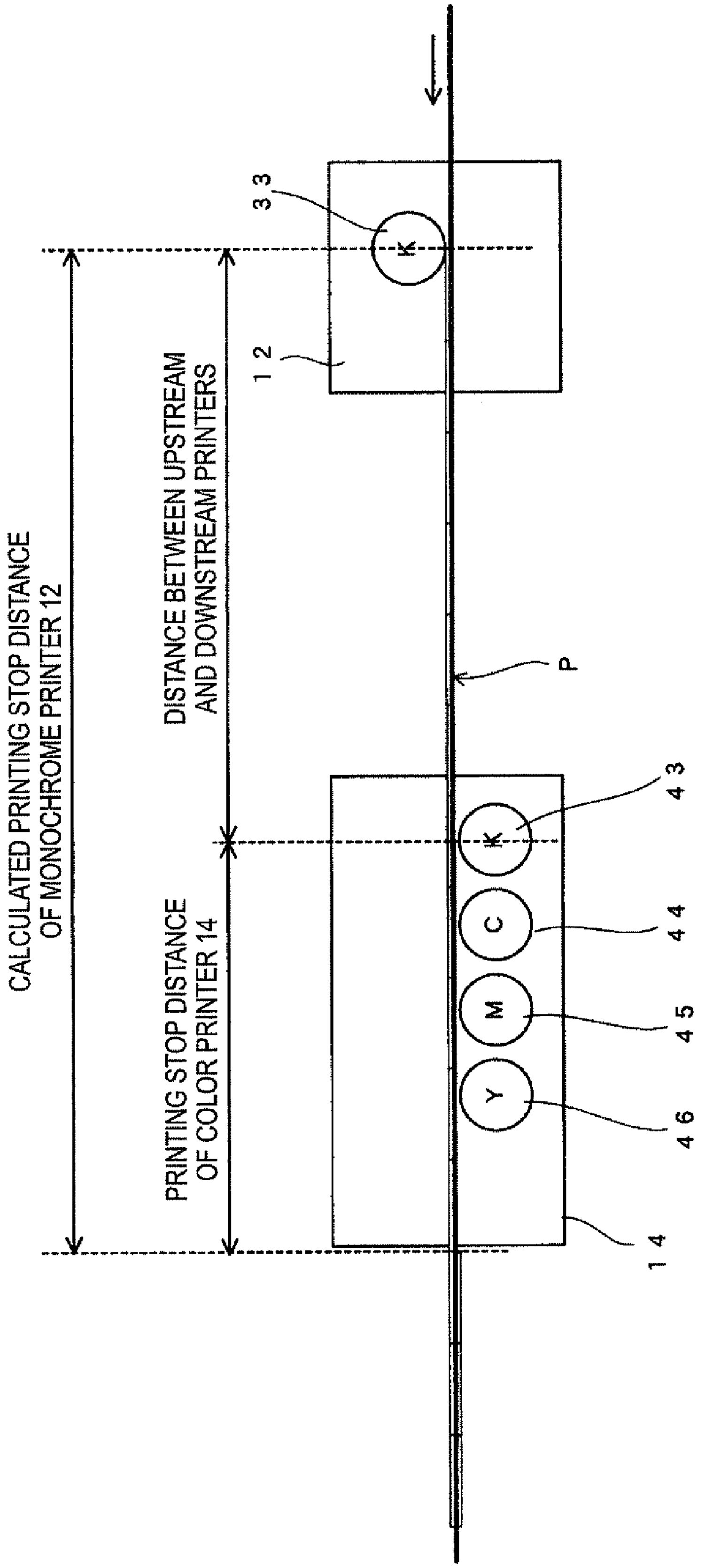
FIG. 15 illustrates a printing stop operation of the cascade printing system according to the exemplary embodiment.

FIG. 15 conceptually shows how step S506 is executed. To facilitate understanding, the buffer device 18 and the flipping device 16 are omitted and the color printer 14 is drawn in such a manner that images are formed on the bottom surface of a continuous sheet P. In this example, the page printing stop distance of the color printer 14 is a distance from the position where a K color (first color) toner image is transferred to the output position of the color printer 14 that pages for each of which all of Y, M, C, and K toner images have been formed should clear. The rear end of the page printing stop distance may be the input end of a post-processing device (a take-up device, a cutting device, or the like), a position that is immediately behind the transfer position of a Y color toner image, or a like position.

In the example of FIG. 15, the distance between the upstream and downstream printers is a distance between the position where a toner image is transferred to a continuous sheet P in the monochrome printer 12 and the position where a first color (K color) toner image is transferred in the color printer 14. In the example of FIG. 15, blank printing is performed in the monochrome printer 12, whereby the continuous sheet P is paid out from the monochrome printer 12 toward the color printer 14 and the continuous sheet P is thereby prevented from becoming too tense.

As is understood from FIG. 15, step S506 can prevent occurrence of pages on which low-image quality color images are formed. Step S506 will be described later in detail.

Returning to FIG. 5, if it is judged at step S505 that the connection partner printer is not located downstream of the monochrome printer 12, the process moves to step S507. This corresponds to a case that contrary to the case of FIG. 1 the color printer 14 is located upstream of the monochrome printer 12. In this case, it is judged at step S507 whether or not the page printing stop distance of the upstream color printer 14 is longer than the distance between the upstream and downstream printers.

If the page printing stop distance of the upstream color printer 14 is longer than the distance between the upstream and downstream printers (S507: yes), the process moves to step S508, where the downstream monochrome printer 12 is stopped when the continuous sheet P has been paid out by a distance that is the page printing stop distance of the upstream color printer 14 minus the distance between the upstream and downstream printers after completion of page printing in the downstream monochrome printer 12. In this case, since the page printing stop distance of the color printer 14 is longer than the distance between the upstream and downstream printers, if the downstream monochrome printer 12 were stopped upon completion of printing of its own image data (i.e., upon completion of page printing) in itself, the continuous sheet P would continue to be paid out thereafter from the upstream color printer 14 and thereby loosened. In view of this, at step S508, the monochrome printer 12 conveys the continuous sheet P further even after completion of page printing therein by the distance that would otherwise cause the above loosening. Loosening of the continuous sheet P between the printers 12 and 14 is thus prevented.

If it is judged that the page printing stop distance of the upstream color printer 14 is not longer than the distance between the upstream and downstream printers (S507: no), the process moves to step S509, where the downstream monochrome printer 12 is stopped when the continuous sheet P has been paid out by a distance that is equal to the page printing stop distance of the upstream color printer 14 after completion of page printing in the upstream color printer 14. In this case, the completion of page printing in the upstream color printer 14 means completion of transfer for the last page at the most upstream transfer position (in the example of FIG. 4B, K color transfer position). Therefore, the upstream color printer 14 transfers toner images of the remaining three colors after completion of page printing and conveys the continuous sheet P further by the page printing stop distance. Accordingly, at step S509, the downstream monochrome printer 12 is stopped before printing all image data held by itself, that is, at a time point when the upstream color printer 14 has conveyed the continuous sheet P by its page printing stop distance. The continuous sheet P is thus prevented from being loosened or becoming too tense between the printers 12 and 14.

Figure 6:
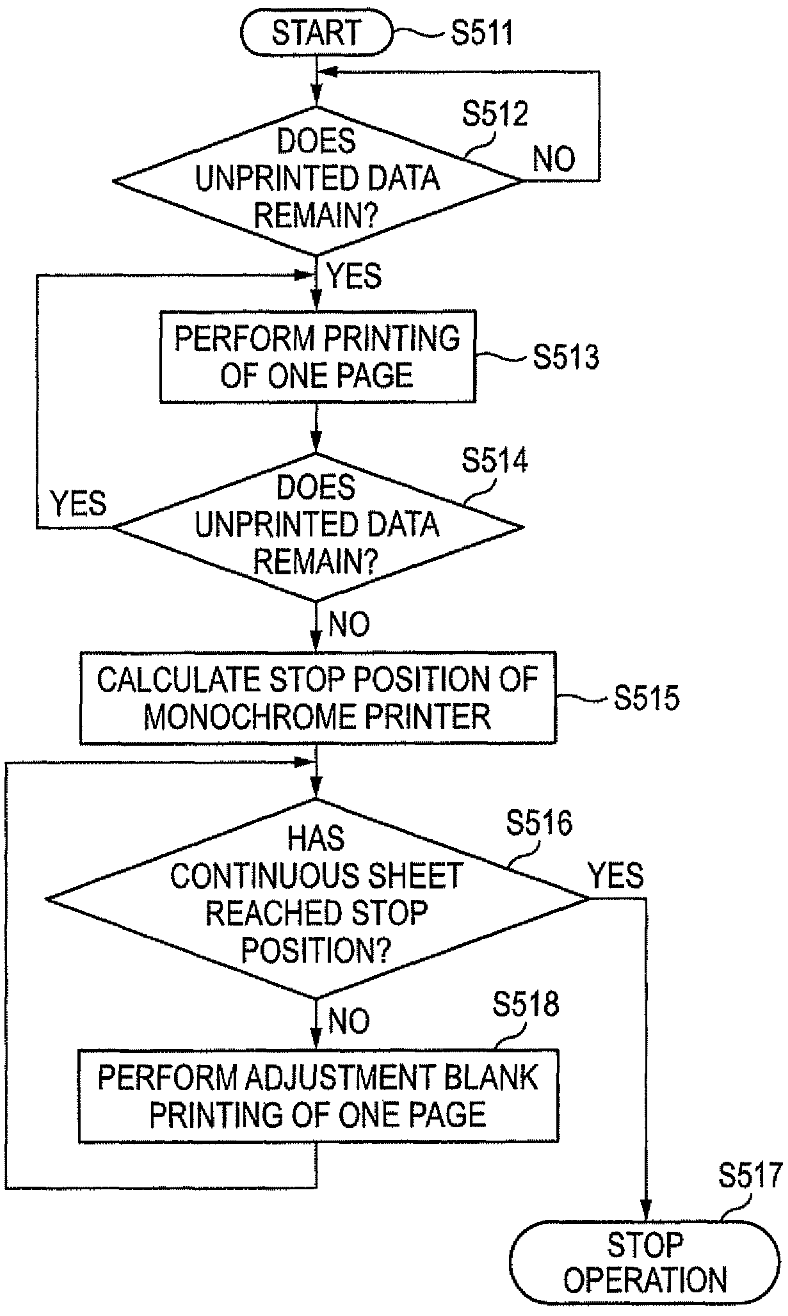
FIG. 6 is a flowchart showing the details of steps S506 and S508 shown in FIG. 5.

Steps S506 and S508 shown in FIG. 5 will be described below in more detail. FIG. 6 shows the details of steps S506 and S508 shown in FIG. 5. Steps S511-S517 are executed as step S506 or S508 shown in FIG. 5. At step S512, it is judged whether or not unprinted data remains. If unprinted data remains, printing of one page is performed at step S513. At step S514, it is again judged whether or not unprinted data remains. If unprinted data remains, the process returns to step S513. If not, at step S515 a position of the continuous sheet P for a stop of operation of the monochrome printer 12 is calculated, that is, an extra distance by which to pay out the continuous sheet P toward downstream side of the cascade printing system is calculated.

At step S515, in the case of step S506 shown in FIG. 5, a print stop distance shown in FIG. 15 is calculated and a stop position of the continuous sheet P is calculated on the basis of the calculated print stop distance.

At step S516, it is judged whether or not the continuous sheet P has reached the stop position that was calculated at step S515. If the continuous sheet P has reached the stop position, at step S517 the operation of the monochrome printer 12 is stopped and the conveyance of the continuous sheet P is stopped. If the continuous sheet P has not reached the stop position yet, at step S518 adjustment blank printing of one page is performed. Then, the process returns to step S516.

Figure 7:
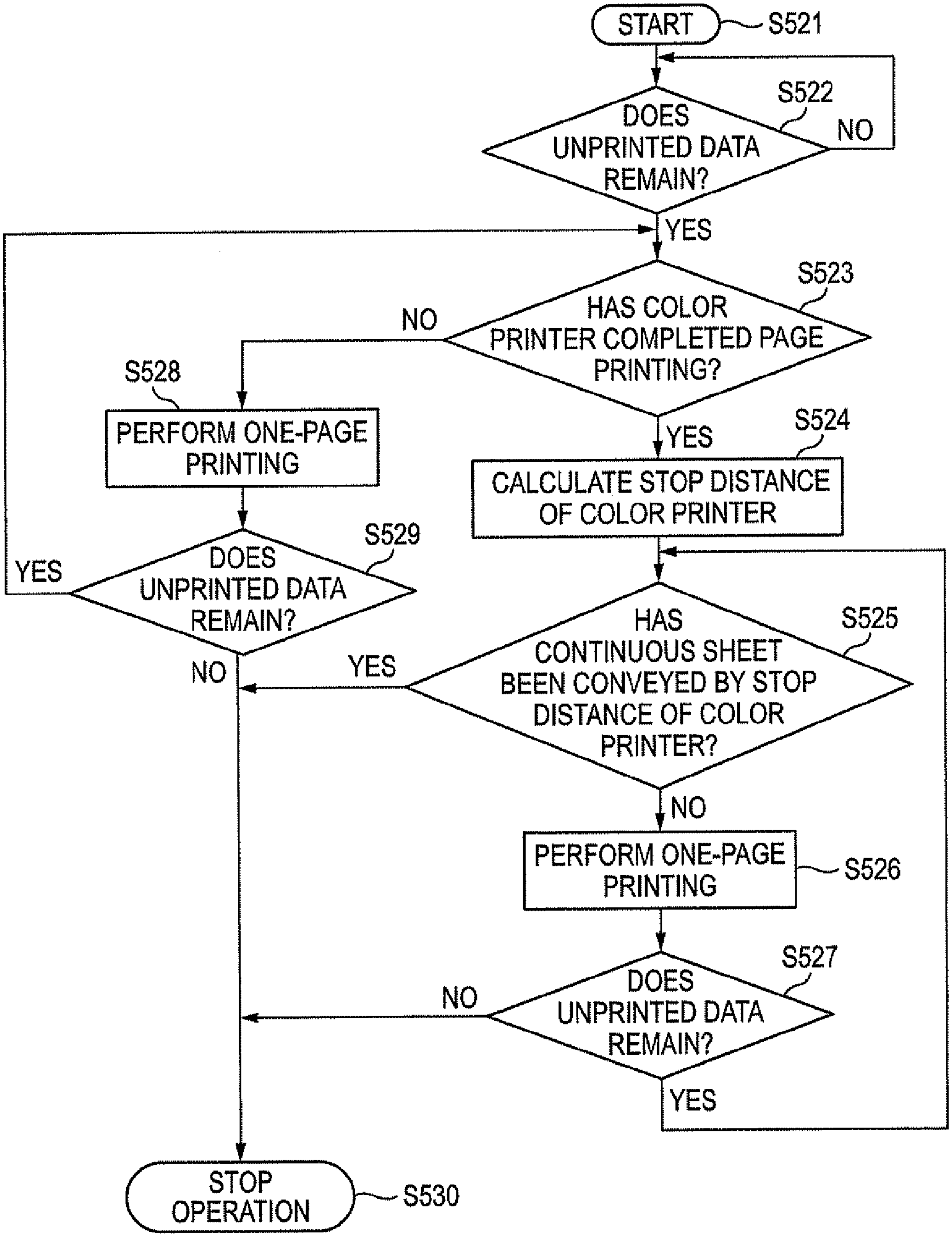
FIG. 7 is a flowchart showing the details of step S509 shown in FIG. 5.

Next, step S509 shown in FIG. 5 will be described in detail. FIG. 7 is a flowchart showing the details of step S509 shown in FIG. 5. When this process is started at step S521, it is judged at step S522 whether or not unprinted data remains. If unprinted data remains, it is judged at step S523 whether or not the color printer 14 (in this case, located upstream of the monochrome printer 12) has completed page printing (i.e., whether or not the transfer at the most upstream transfer position has been completed).

If the upstream color printer 14 has completed page printing, at step S524 a stop distance (conveyance distance of the continuous sheet P) that is necessary for the color printer 14 is calculated. At step S525, it is judged whether or not the continuous sheet P has been conveyed by the stop distance that was calculated at step S524. If the continuous sheet P has been conveyed by the stop distance, at step S530 the operation of the monochrome printer 12 is stopped and the conveyance of the continuous sheet P is stopped. If the continuous sheet P has not been conveyed by the stop distance yet, the process moves to step S526, where printing of one page is performed. At step S527, it is judged whether or not unprinted data remains. If unprinted data remains, the process returns to step S525. If not, the operation of the monochrome printer 12 is stopped at step S530.

If the process moves to step S528 from step S523, one-page printing is performed at step S528. At step S529, it is judged whether or not unprinted data remains. If unprinted data remains, the process returns to step S523. If not, the operation of the monochrome printer 12 is stopped at step S530.

Figure 8:
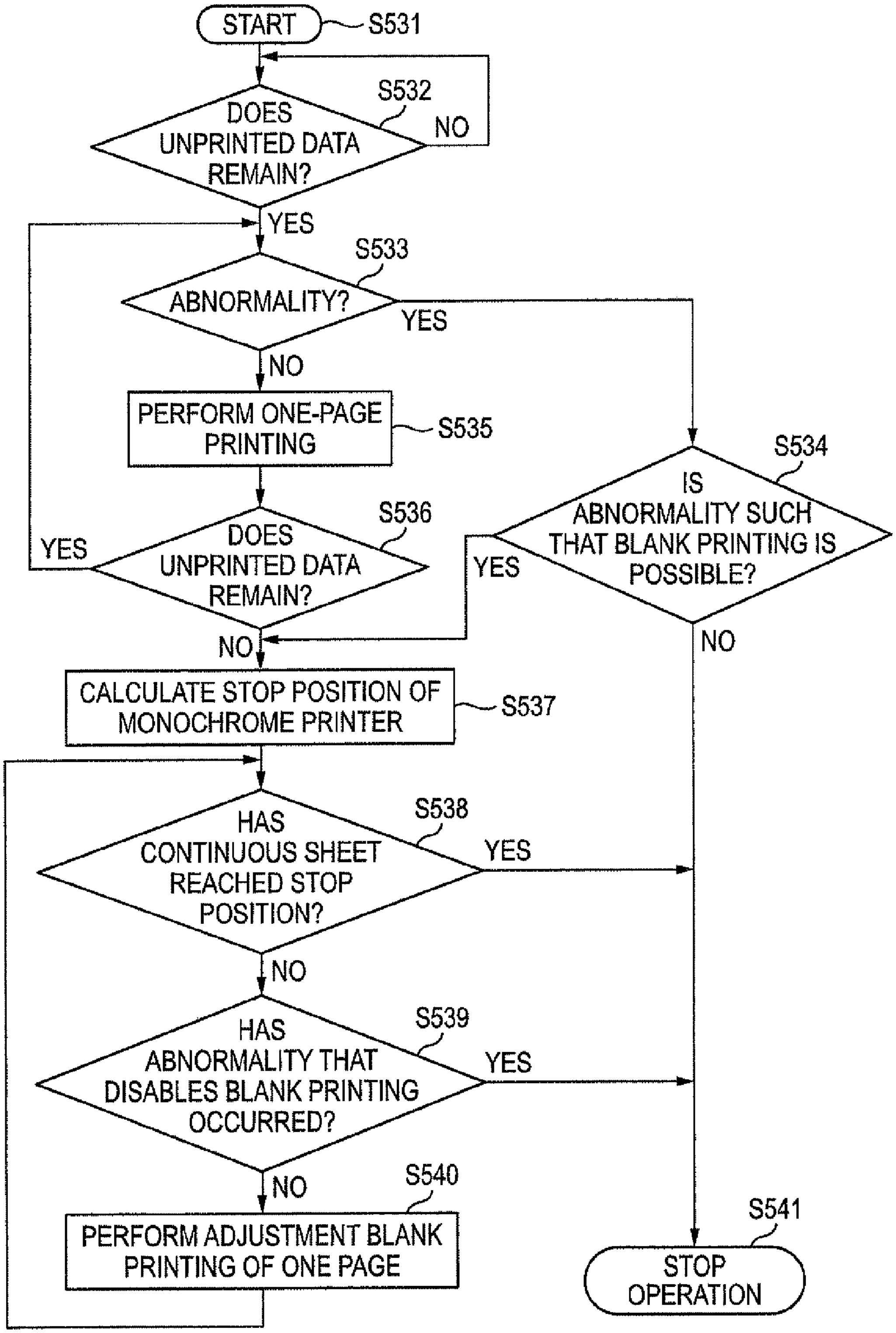
FIG. 8 is a flowchart of an example abnormality process of steps S506 and S508 shown in FIG. 5.

Next, an example abnormality process of steps S506 and S508 shown in FIG. 5 will be described. FIG. 8 shows an example abnormality process. When this process is started at step S531, it is judged at step S532 whether or not unprinted data remains. If unprinted data remains, it is judged at step S533 whether or not an abnormality such as a failure of the apparatus, a sheet jam, or the like has occurred. If it is judged that an abnormality has occurred, the process moves to step S534. If not, one-page printing is performed at step S535. Then, it is judged at step S536 whether or not unprinted data remains. If unprinted data remains, the process returns to step S533. If not, the process moves to step S537.

At step S537, a position of the continuous sheet P for a stop of operation of the monochrome printer 12 (in this case, upstream monochrome printer 12) is calculated in the manner that was described above in connection with step S506 or S508.

At step S538, it is judged whether or not the continuous sheet P has reached the calculated stop position. If the continuous sheet P has reached the calculated stop position, at step S541 the operation of the monochrome printer 12 is stopped. If not, the process moves to step S539, where it is judged whether or not an abnormality that disables blank printing has occurred. If an abnormality that disables blank printing has occurred, at step S541 the operation of the monochrome printer 12 is stopped. If not, the process moves to step S540, where adjustment blank printing of one page is performed. Then, the process returns to step S538.

If the process moves to step S534 from step S533, it is judged at step S534 whether or not the abnormality is such that blank printing is possible. If the abnormality is such that blank printing is possible, the process moves to step S537. If the abnormality is such that blank printing is impossible, at step S541 the operation of the monochrome printer 12 is stopped.

Figure 9:
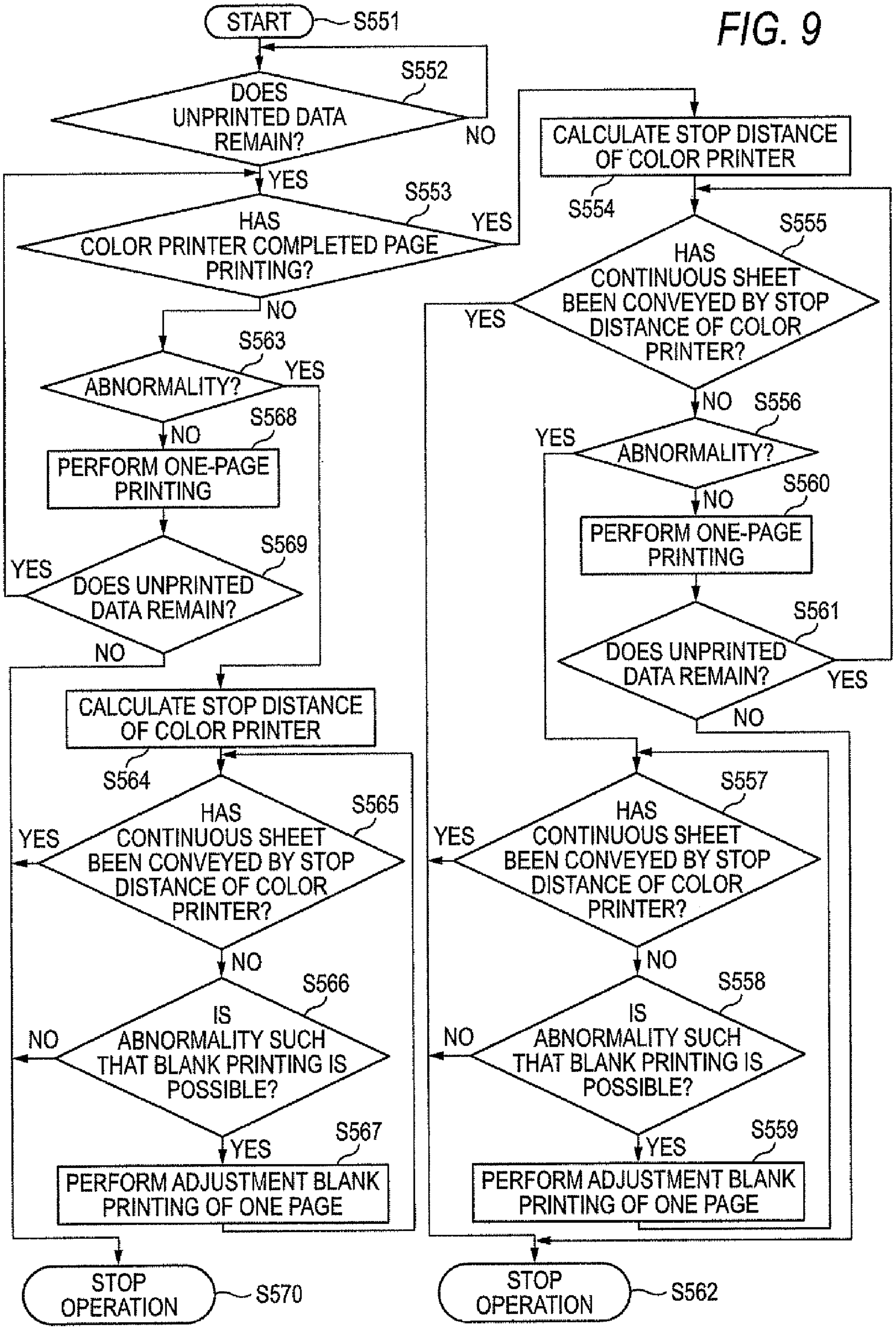
FIG. 9 is a flowchart of an example abnormality process of step S509 shown in FIG. 5.

Next, an example abnormality process of step S509 shown in FIG. 5 will be described. FIG. 9 shows an example abnormality process. When the process of FIG. 9 is started at step S551, it is judged at step S552 whether or not unprinted data remains. If unprinted data remains, it is judged at step 553 whether or not the color printer 14 (in this case, located upstream of the monochrome printer 12) has completed page printing (i.e., whether or not the transfer at the most upstream transfer position has been completed). If the color printer 14 has completed page printing, the process moves to step S554. If not, the process moves to step S563.

At step S554, a stop distance that is necessary for the color printer 14 (see FIG. 15) is calculated. At step S555, it is judged whether or not the continuous sheet P has been conveyed by the calculated distance. If the continuous sheet P has been conveyed by the calculated distance, at step S562 the operation of the monochrome printer 12 is stopped. If not, the process moves to step S556, where it is judged whether or not an abnormality has occurred. If an abnormality has occurred, the process moves to step S557.

At step S557, it is judged whether or not the continuous sheet P has been conveyed by the distance that was calculated at step S554. If the continuous sheet P has been conveyed by the calculated distance, at step S562 the operation of the monochrome printer 12 is stopped. If not, it is judged at step S558 whether or not the abnormality is such that blank printing is possible. If the abnormality is such that blank printing is possible, the process moves to step S559. If not, the operation of the monochrome printer 12 is stopped at step S562. At step S559, adjustment blank printing of one page is performed.

If the process moves to step S560 from step S556, one-page printing is performed at step S560. At step S561, it is judged whether or not unprinted data remains. If unprinted data remains, the process returns to step S555. If not, the operation of the monochrome printer 12 is stopped at step S562.

If it is judged at step S553 that the color printer 14 (in this case, located upstream of the monochrome printer 12) has not completed page printing yet, the process moves to step S563, where it is judged whether or not an abnormality has occurred. If it is judged that an abnormality has occurred, the process moves to step S564, where a stop distance of the color printer 14 is calculated. At step S565, it is judged whether or not the continuous sheet P has been conveyed by the calculated stop distance. If the continuous sheet P has been conveyed by the calculated stop distance, at step S570 the operation of the monochrome printer 12 is stopped. If not, the process moves to step S566.

At step S566, it is judged whether or not the abnormality is such that blank printing is possible. If the abnormality is such that blank printing is possible, at step S567 adjustment blank printing of one page is performed. Then, the process returns to step S565. If it is judged at step S566 that the abnormality is such that blank printing is impossible, at step S570 the operation of the monochrome printer 12 is stopped.

If it is judged at step S563 that no abnormality has occurred, at step S568 on-going printing of an image of one page is completed. At step S569, it is judged whether or not unprinted data remains. If unprinted data remains, the process returns to step S553. If not, the operation of the monochrome printer 12 is stopped at step S570.

(Example Operation 2)

Figure 17:
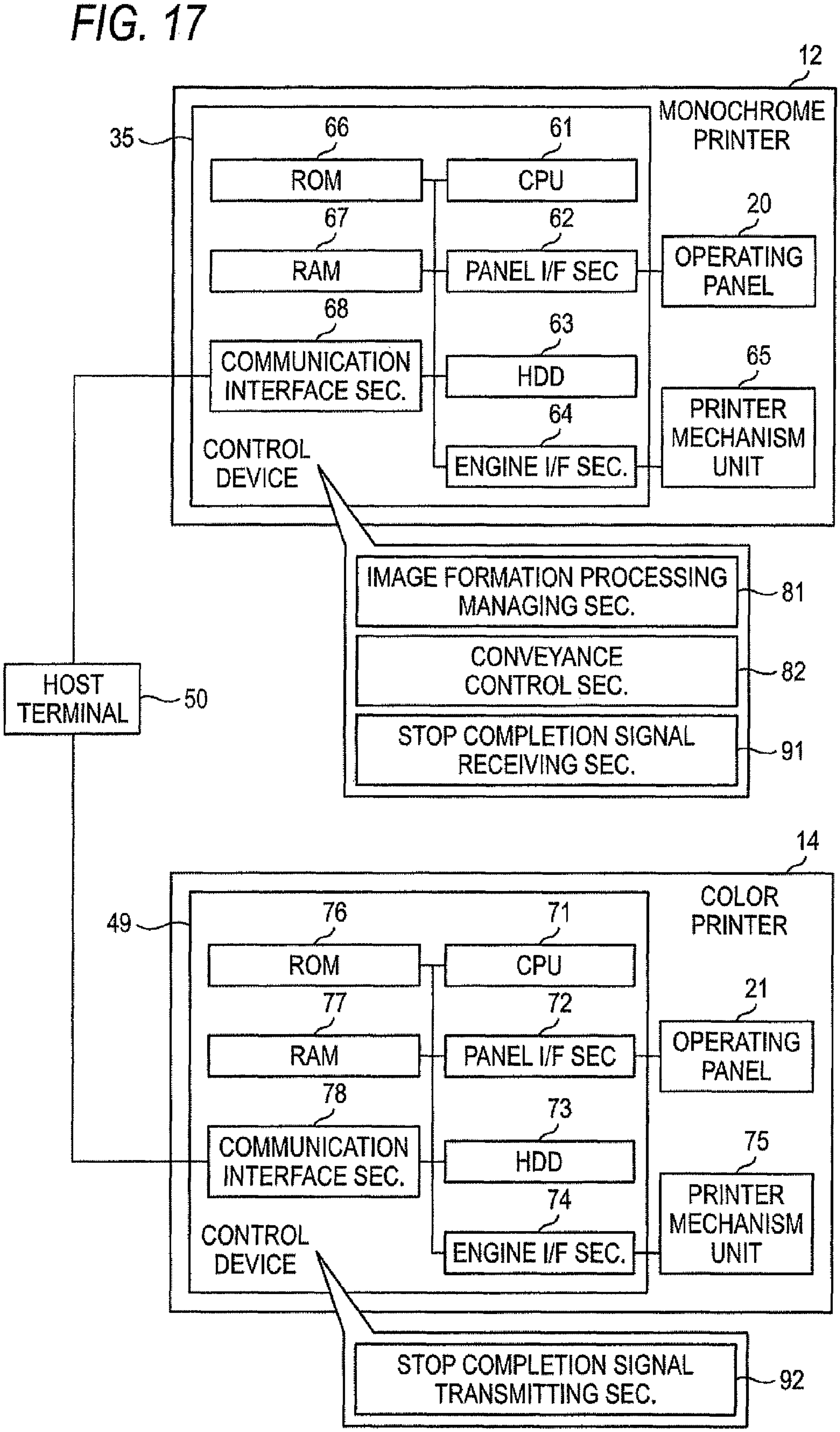
FIG. 17 is a block diagram showing another control system of the cascade printing system according to the exemplary embodiment.

FIG. 17 shows a hardware configuration corresponding to example operation 2, which is different from the configuration of FIG. 3. From the functional viewpoint, the configuration of FIG. 17 is different from that of FIG. 3 in that the control apparatus 49 is equipped with a stop completion signal transmitting section 92 and the control device 35 is equipped with a stop completion signal receiving section 91. The stop completion signal transmitting section 92 sends, to the monochrome printer 12, as a stop completion signal, a signal to the effect that a stop of an image forming operation of the color printer 14 has been detected (e.g., printed pages have been ejected to outside the apparatus (see FIG. 15)). The stop completion signal receiving section 91 receives the signal sent from the stop completion signal transmitting section 92. A stop control is performed in the monochrome printer 12 on the basis of the stop completion signal received by the stop completion signal receiving section 91. The other part of the configuration is the same as shown in FIG. 3.

Figure 10:
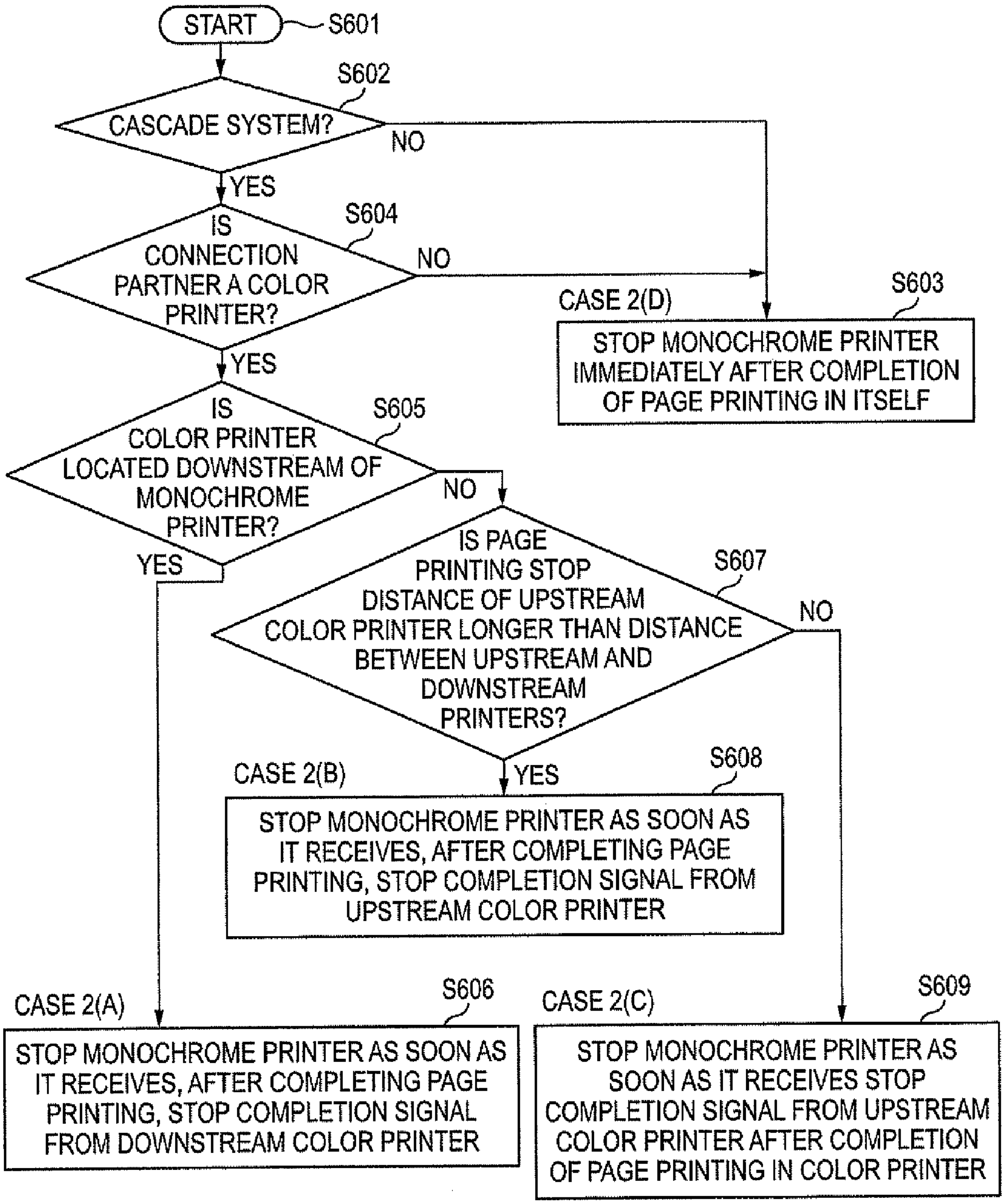
FIG. 10 is a flowchart of another process that is executed by a monochrome printer in stopping a printing operation.

An example process will be described below. The prerequisite conditions for operation are the same as in example operation 1. For example, assume that an instruction to stop a double-sided printing operation being performed on a continuous sheet P in the cascade printing system of FIG. 1 is made in response to an operator manipulation or due to a certain abnormality. In this case, the process of FIG. 10 is started at step S601. At step S602, it is judged whether or not the monochrome printer 12 belongs to a cascade printing system. The process moves to step S603 if the monochrome printer 12 belongs to a cascade printing system, and moves to step S604 if not.

At step S603, image formation and conveyance of the continuous sheet P are stopped immediately after completion of page printing in the monochrome printer 12. At step S604, it is judged whether or not the printer to which the monochrome printer 12 is connected in the cascade printing system is a color printer. If the connection partner printer is not a color printer, the process moves to step S603. If the connection partner printer is a color printer, the process moves to step S605, where it is judged whether or not the connection partner color printer 14 is located downstream of the monochrome printer 12.

If the connection partner color printer 14 is located downstream of the monochrome printer 12, the process moves to step S606. This case corresponds to the configuration of FIG. 1. The operation of the monochrome printer 12 is stopped as soon as it receives, after completing page printing, a stop completion signal sent from the downstream color printer 14. Also in this case, the printing operation end state shown in FIG. 15 is obtained.

The stop completion signal is a signal that is sent from the color printer 14 to the monochrome printer 12 on the basis of detection, by the color printer 14, of output, from the color printer 14, of pages that were subjected to printing when a stop instruction was made.

At step S607, it is judged whether or not the page printing stop distance of the upstream color printer 14 is longer than the distance between the upstream and downstream printers. The process moves to step S608 if the judgment result is "yes," and moves to step S609 if the judgment result is "no." At step S608, the downstream monochrome printer 12 is stopped as soon as it receives, after completing page printing, a stop completion signal that is sent from the upstream color printer 14. At step S609, the downstream monochrome printer 12 is stopped as soon as it receives a stop completion signal that is sent from the upstream color printer 14 after completion of page printing in the color printer 14.

Figure 11:
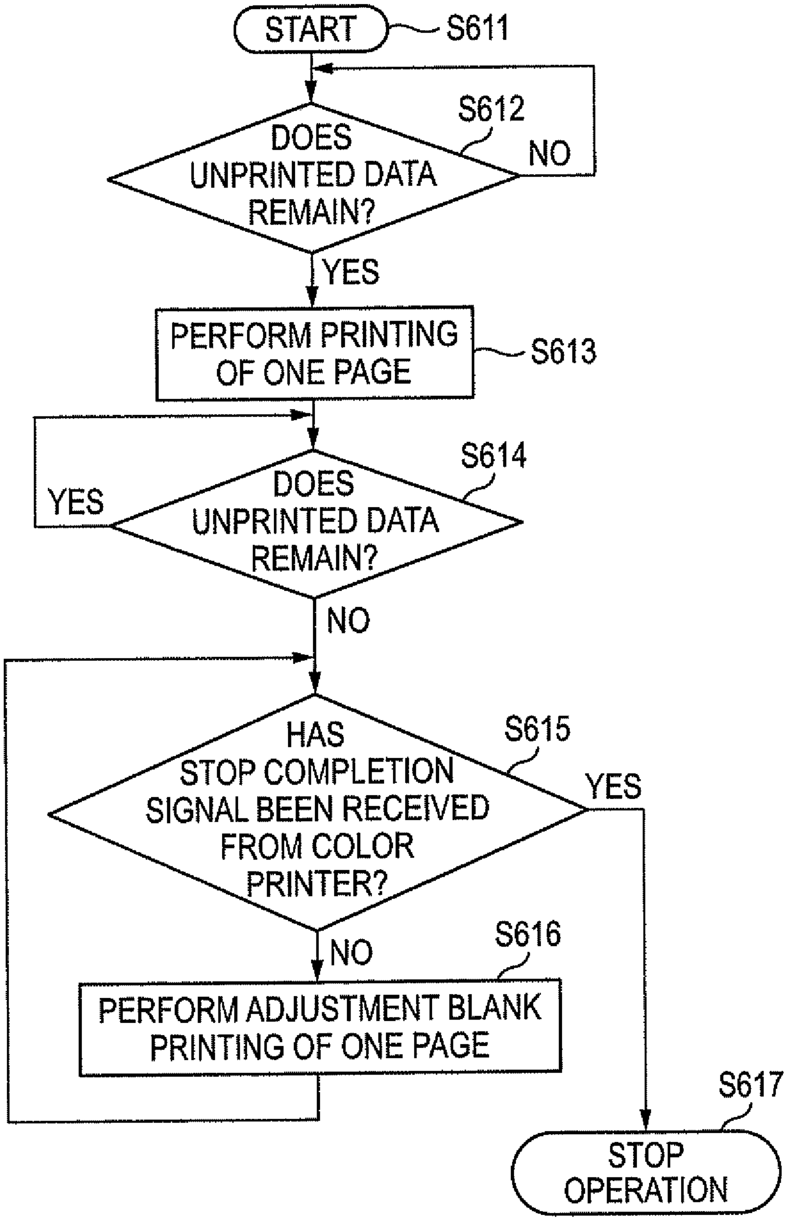
FIG. 11 is a flowchart showing the details of steps S606 and S608 shown in FIG. 10.

Next, a detailed example of steps S606 and S608 shown in FIG. 10 will be described. FIG. 11 shows a detailed example of steps S606 and S608 shown in FIG. 10. When the process of FIG. 11 is started at step S611, it is judged at step S612 whether or not unprinted data remains. If unprinted data remains, printing of one page is performed at step S613. At step S614, it is again judged whether or not unprinted data remains. If unprinted data does not remain at this stage, it is judged at step S615 whether or not a stop completion signal has been received from the color printer 14.

If it is judged at step S615 that a stop completion signal has been received, at step S617 the operation of the monochrome printer 12 is stopped and the conveyance of the continuous sheet P is stopped. If it is judged at step S615 that a stop completion signal has not been received, at step S616 adjustment blank printing of one page is performed. Then, the process returns to step S516 (the conveyance of the continuous sheet P is continued).

Figure 12:
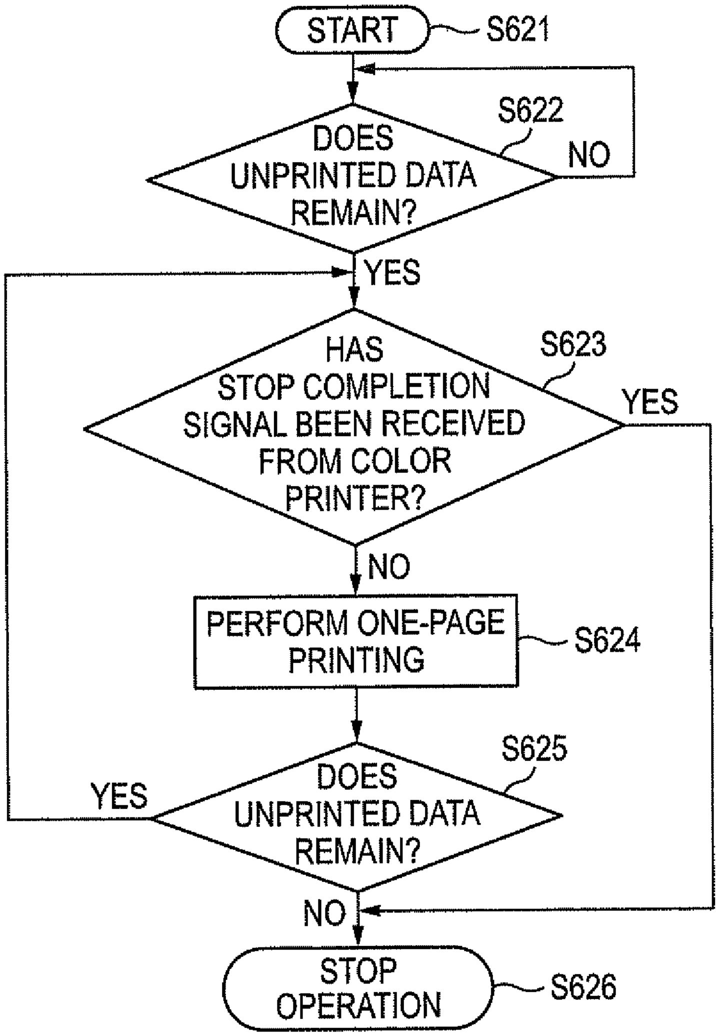
FIG. 12 is a flowchart showing the details of step S609 shown in FIG. 10.

Next, a detailed example of step S609 shown in FIG. 10 will be described. FIG. 12 shows a detailed example of step S609 shown in FIG. 10. When the process of FIG. 12 is started at step S621, it is judged at step S622 whether or not unprinted data remains. If unprinted data remains, it is judged at step S623 whether or not a stop completion signal has been received from the upstream color printer 14. If a stop completion signal has been received, at step S626 the operation of the monochrome printer 12 is stopped. If not, printing of one page is performed at step S624. Then, the process moves to step S625 (the paying-out of the continuous sheet P is continued).

At step S625, it is judged whether or not unprinted data remains. If unprinted data remains, the process returns to step S623. If not, the operation of the monochrome printer 12 is stopped at step S626.

Figure 13:
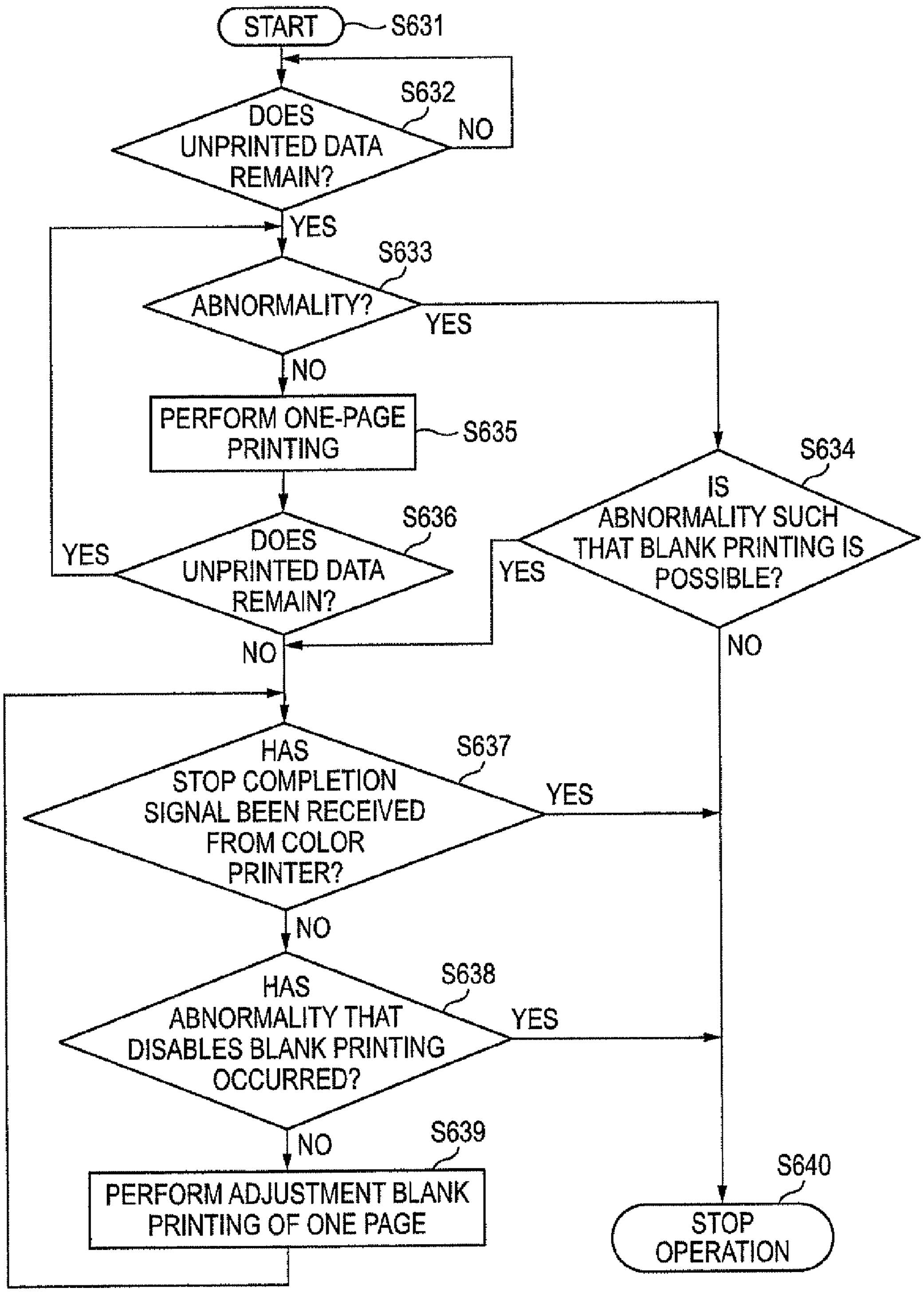
FIG. 13 is a flowchart of an example abnormality process of steps S606 and S608 shown in FIG. 10.

Next, an example abnormality process of steps S606 and S608 shown in FIG. 10 will be described. FIG. 13 shows an example abnormality process of steps S606 and S608 shown in FIG. 10. When the process of FIG. 13 is started at step S631, it is judged at step S632 whether or not unprinted data remains. If unprinted data remains, it is judged at step S633 whether or not an abnormality has occurred. The process moves to step S634 if it is judged that an abnormality has occurred, and moves to step S635 if not.

At step S634, it is judged whether or not the abnormality is such that blank printing is possible. If blank printing is possible, the process moves to step S637. If even blank printing is impossible, at step S670 the operation of the monochrome printer 12 is stopped.

If the process moves to step S635 from step S633, one-page printing is performed at step S635. At step S636, it is judged whether or not unprinted data remains. If unprinted data remains, the process returns to step S633. If not, the process moves to step S637.

At step S637, it is judged whether or not a stop completion signal has been received from the color printer 14. If a stop completion signal has been received, at step S640 the operation of the monochrome printer 12 is stopped. If not, it is judged at step S638 whether or not an abnormality that disables blank printing has occurred. If an abnormality that disables blank printing has occurred, at step S640 the operation of the monochrome printer 12 is stopped. If not, at step S639 adjustment blank printing of one page is performed. Then, the process returns to step S637.

Figure 14:
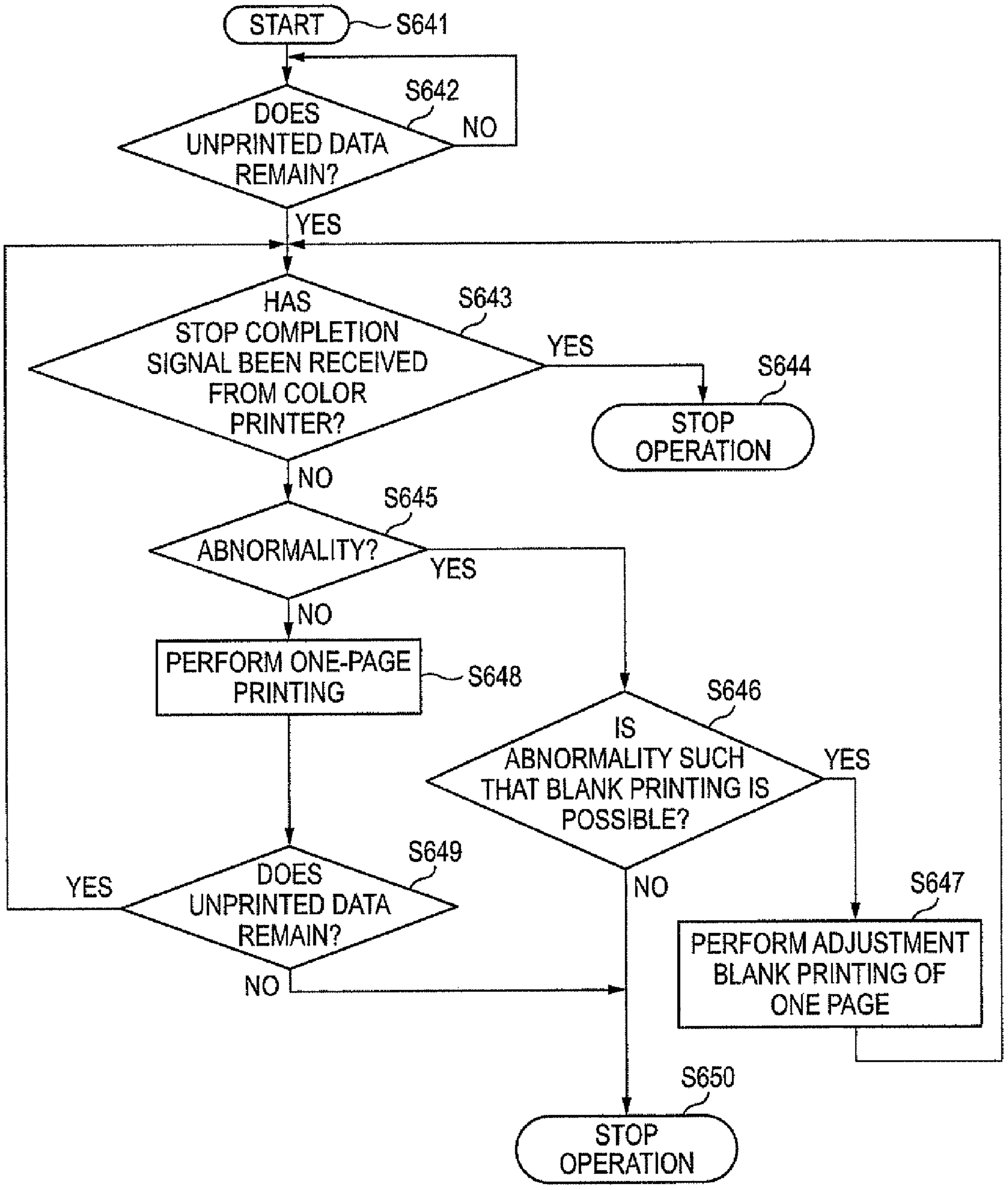
FIG. 14 is a flowchart of an example abnormality process of step S609 shown in FIG. 10.

Next, an example abnormality process of step S609 shown in FIG. 10 will be described. FIG. 14 shows an example abnormality process of step S609 shown in FIG. 10. When the process of FIG. 14 is started at step S641, it is judged at step S642 whether or not unprinted data remains. If unprinted data remains, it is judged at step 643 whether or not a stop completion signal has been received from the color printer 14. If a stop completion signal has been received, the operation of the monochrome printer 12 is stopped. If not, it is judged at step S645 whether or not an abnormality has occurred.

If it is judged at step S645 that an abnormality has occurred, it is judged at step S646 whether or not the abnormality is such that blank printing is possible. If the abnormality is such that blank printing is possible, at step S647 adjustment blank printing of one page is performed. Then, the process returns to step S643. If it is judged at step S646 that the abnormality is such that blank printing is impossible, at step S650 the operation of the monochrome printer 12 is stopped.

If it is judged at step 3645 that no abnormality has occurred, at step S648 one-page printing is performed. At step S649, it is judged whether or not unprinted data remains. If unprinted data remains, the process returns to step S643. If not, the operation of the monochrome printer 12 is stopped at step S650.

(Advantages)

Cascade printing systems using two color printers can produce printed matter that provides a remarkable visual effect, they impose a heavy burden in terms of equipment cost because color printers are more expensive than monochrome printers. On the other hand, cascade printing systems like the one according to the exemplary embodiment can balance the visual effect and the economy because on one hand it performs color printing which provides a superior visual effect and on the other hand it performs monochrome printing for characters and numerals that do not require color printing. The cascade printing system 10 of FIG. 1 is such a cascade printing system.

Incidentally, in a cascade printing system in which a monochrome printer and a color printer are combined as in the case of FIG. 1, because the two printers stop in different manners, images that are very low in image quality are formed in the color printer as described above with reference to FIGS. 4A and 4B if the two printers are merely stopped simultaneously. If it is attempted to solve the problem of formation of images that are very low in image quality, another problem arises that a continuous sheet receives excessive tension or is loosened because the two printers are stopped at different times.

In view of the above, in the cascade printing system according to the exemplary embodiment in which the monochrome printer 12 and the color printer 14 are combined, the monochrome printer 12 is not stopped upon reception of a stop instruction. Instead, the monochrome printer 12 continues to convey a continuous sheet P to the color printer 14 (which is stopped with a delay if it is attempted to solve the original problem) by, for example, printing adjustment blank pages. As a result, the two printers can be stopped at the same time and the phenomenon that a continuous sheet P becomes too tense or is loosened between the two printers can be prevented.

Since the stop timing is adjusted by the monochrome printer 12's performing adjustment blank printing, the invention can be realized by utilizing stop processing of conventional printers.

(Modifications)

Programs for the above-described processes may be stored in a proper storage medium and supplied from it. And a modification is possible in which the host terminal 50 performs each of above-described processes and sends control signals reflecting results of execution of the process to the monochrome printer 12 and the color printers 14 and the printers 12 and 14 operate according to the received control signals.

A modification is possible in which details of a control for adjustment blank printing to be performed by the monochrome printer 12 are determined in advance and stored in a memory and an actual control is performed on the basis of the details stored. The details of the control may be stored in any of the monochrome printer 12, the color printer 14, and the host terminal 50 (or even an external server or the like). Another modification is possible in which the color printer 14 performs calculation relating to stop timing of the monochrome printer and notifies the monochrome printer 12 of a calculation result and a stop of the monochrome printer 12 is controlled according to that notice.

Figure 16:
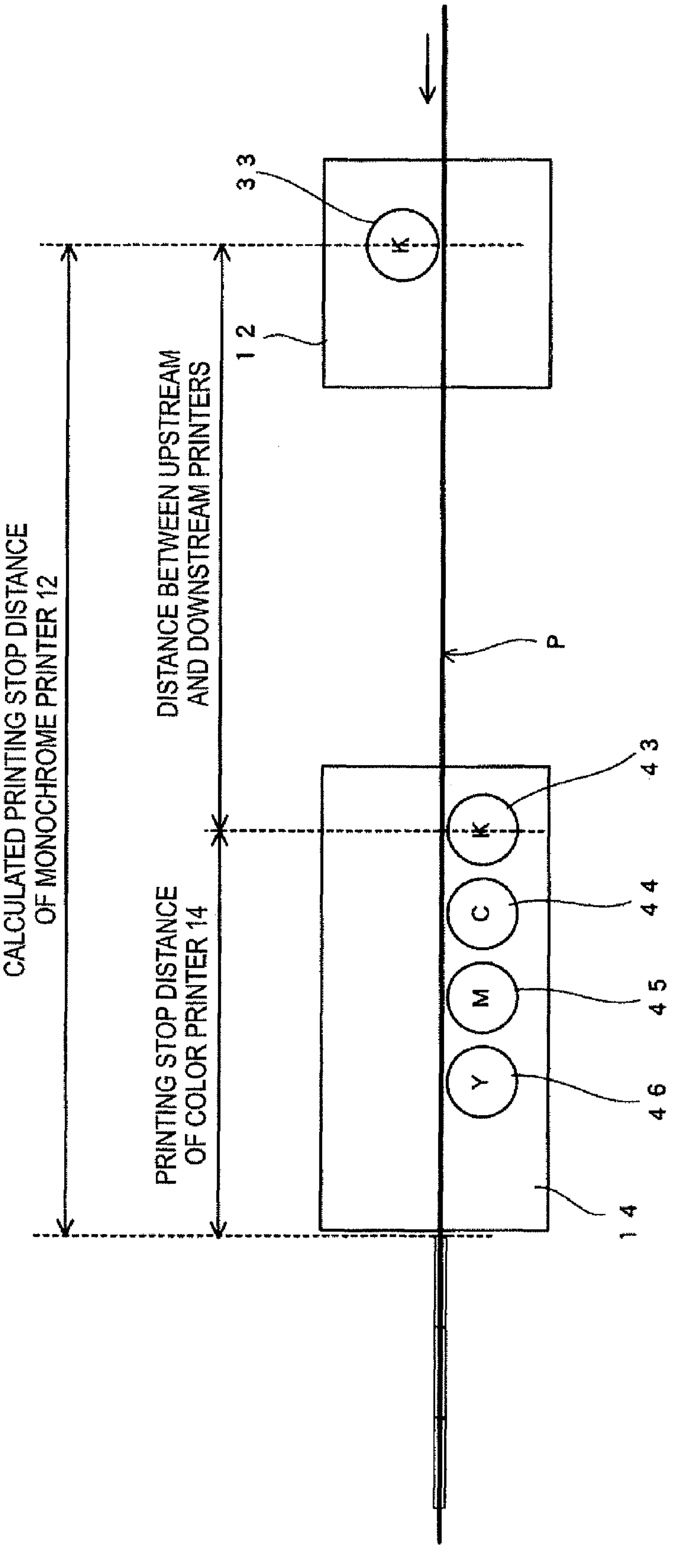
FIG. 16 illustrates another printing stop operation of the cascade printing system according to the exemplary embodiment.

FIG. 15 illustrates the example in which conveyance of a continuous sheet P is performed so as to match the stop timing of the downstream color printer 14 by the upstream monochrome printer 12's performing adjustment blank printing. Instead of doing adjustment blank printing, the monochrome printer 12 may operate in such a manner that operations of the photoreceptor drum 33 and the exposing device are stopped and a continuous sheet P is merely paid out downward. FIG. 16 illustrates such an operation.

Although in the exemplary embodiment the monochrome printer 12 and the color printer 14 are combined, the image formation apparatus combined are not limited to a monochrome printer and a color printer as long as they require different stop times. The image forming method is not limited to the electrophotographic method of the exemplary embodiment and may be another method such as the ink-jetting method.

INDUSTRIAL APPLICABILITY

The invention can be applied to techniques for forming an image on a continuous recording medium using different types of image formation apparatus.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image formation apparatus comprising:

an image formation processing managing unit that manages first image formation processing to form an image on a face of plane-shaped recording medium based on received information; and a control unit that controls conveyance of the plane-shaped recording medium between the image formation apparatus which performs the first image formation processing and another image formation apparatus which performs second image formation processing to form an image on the other face of the plane-shaped recording medium, wherein a second distance required for completion of forming one page of the image in the second image formation processing by said another image formation apparatus in response to receiving an instruction of stopping an image forming operation is longer than a first distance required for completion of forming one page of the image in the first image formation processing by the image formation apparatus in response to receiving the instruction of stopping the image forming operation, wherein in response to receiving the instruction to stop the image forming operation, the control unit performs the control of conveyance of the plane-shaped recording medium by conveying the plane-shaped recording medium by the image formation apparatus for a given distance longer than the first distance and then stopping the conveyance by the image formation apparatus, so that the conveyances of both of the image formation apparatus and said another image formation apparatus are stopped substantially at the same time.

2. The image formation apparatus according to claim 1, wherein the control unit performs the control of the conveyance to convey the plane-shaped recording medium until the conveyance of the plane-shaped recording medium by said another image formation apparatus stops.

3. The image formation apparatus according to claim 2, wherein the control unit performs the control of the conveyance to convey the plane-shaped recording medium until said another image formation apparatus conveys the plane-shaped recording medium by a given length corresponding to the second distance.

4. The image formation apparatus according to claim 2, wherein the control unit performs the control of the conveyance to convey the plane-shaped recording medium until receiving a given signal sent from said another image formation apparatus.

5. The image formation apparatus according to claim 1, wherein said another image formation apparatus is a color printer, and the image formation apparatus is a monochrome printer.

6. The image formation apparatus according to claim 1, wherein a blank image formation is performed while the control unit performs the control of the conveyance of the plane-shaped recording medium.

7. The image formation apparatus according to claim 1, wherein the given distance equals to a sum of the second distance and a distance between the image formation apparatus and said another image formation apparatus.

8. An image formation system comprising:

an image formation processing managing unit that manages first image formation processing to form an image on a face of plane-shaped recording medium based on received information; and a control unit that controls conveyance of the plane-shaped recording medium between an image formation apparatus which performs the first image formation processing and another image formation apparatus which performs second image formation processing to form an image on the other face of the plane-shaped recording medium, wherein a second distance required for completion of forming one page of the image in the second image formation processing by said another image formation apparatus in response to receiving an instruction of stopping an image forming operation is longer than a first distance required for completion of forming one page of the image in the first image formation processing by the image formation apparatus in response to receiving the instruction of stopping the image forming operation, wherein in response to receiving the instruction to stop the image forming operation, the control unit performs the control of conveyance of the plane-shaped recording medium by conveying the plane-shaped recording medium by the image formation apparatus for a given distance longer than the first distance and then stopping the conveyance by the image formation apparatus, so that the conveyances of both of the image formation apparatus and said another image formation apparatus are stopped substantially at the same time.

9. The image formation system according to claim 8, wherein the given distance equals to a sum of the second distance and a distance between the image formation apparatus and said another image formation apparatus.

10. A non-transitory computer readable medium storing a program causing a computer to perform a process for image formation, the process comprising:

managing first image formation processing to form an image on a face of plane-shaped recording medium based on received information; and controlling conveyance of the plane-shaped recording medium between an image formation apparatus which performs the first image formation processing and another image formation apparatus which performs second image formation processing to form an image on the other face of the plane-shaped recording medium, wherein a second distance required for completion of forming one page of the image in the second image formation processing by said another image formation apparatus in response to receiving an instruction of stopping an image forming operation is longer than a first distance required for completion of forming one page of the image in the first image formation processing by the image formation apparatus in response to receiving the instruction of stopping the image forming operation, wherein in response to receiving the instruction to stop the image forming operation, the control step is performed to convey the plane-shaped recording medium by conveying the plane-shaped recording medium by the image formation apparatus for a given distance longer than the first distance and then stopping the conveyance by the image formation apparatus, so that the conveyances of both of the image formation apparatus and said another image formation are stopped substantially at the same time.

11. The non-transitory computer readable medium according to claim 10, wherein the given distance equals to a sum of the second distance and a distance between the image formation apparatus and said another image formation apparatus.

12. An image formation system comprising:

a color printer that performs first image formation processing to form an image of on a face of a plane-shaped recording medium; and a monochrome printer that performs second image formation processing to form an image on the other face of the plane-shaped recording medium, wherein a first distance required for completion of forming one page of the image in the first image formation processing by the color printer in response to receiving an instruction of stopping an image forming operation is longer than a second distance required for completion of forming one page of the image in the second image formation processing by the monochrome printer in response to receiving the instruction of stopping the image forming operation, wherein, the monochrome printer is connected to the color printer so that double side printing on the plane-shaped recording medium is performed, wherein, in response to receiving the instruction to stop the image forming operation, the monochrome printer conveys the plane-shaped recording medium for the given distance longer than the second distance and then stops the conveyance, so that the conveyances of both of the monochrome printer and the color printer are stopped substantially at the same time.

13. The image formation system according to claim 12, wherein the given distance equals to a sum of the first distance and a distance between the color printer and the monochrome printer.

* * * * *